United States Patent
Nebel et al.

(10) Patent No.: US 8,636,302 B2
(45) Date of Patent: Jan. 28, 2014

(54) STEERING WHEEL WITH HORN CONTACTS ATTACHED BY MEANS OF AN ADHESIVE CONNECTION

(75) Inventors: Raimund Nebel, Obermeitingen (DE); Jürgen Mackensen, Dachau (DE); Karl Binknus, Augsburg (DE)

(73) Assignee: Autoliv Development AB, Värgärdä (SE)

( * ) Notice: Subject to any disclaimer, the term of this patent is extended or adjusted under 35 U.S.C. 154(b) by 9 days.

(21) Appl. No.: 13/321,989

(22) PCT Filed: May 27, 2010

(86) PCT No.: PCT/EP2010/003216
§ 371 (c)(1),
(2), (4) Date: Nov. 22, 2011

(87) PCT Pub. No.: WO2010/136197
PCT Pub. Date: Dec. 2, 2010

(65) Prior Publication Data
US 2012/0080870 A1  Apr. 5, 2012

(30) Foreign Application Priority Data
May 29, 2009 (DE) .......................... 10 2009 023 348

(51) Int. Cl.
*B60R 21/16* (2006.01)
(52) U.S. Cl.
USPC .................................... 280/731; 200/61.54
(58) Field of Classification Search
USPC .................. 280/728.2, 731; 200/61.54–61.57
See application file for complete search history.

(56) References Cited

U.S. PATENT DOCUMENTS

| 5,303,952 | A | | 4/1994 | Shermetaro et al. | |
|---|---|---|---|---|---|
| 5,371,333 | A | * | 12/1994 | Kanai et al. | 200/61.54 |
| 5,399,819 | A | * | 3/1995 | Lang et al. | 200/61.54 |
| 5,639,114 | A | * | 6/1997 | Margetak et al. | 280/728.3 |
| 5,721,409 | A | * | 2/1998 | Enders | 200/61.54 |
| 5,723,834 | A | | 3/1998 | Hambleton, Jr. | |
| 5,934,702 | A | | 8/1999 | Coleman | |

(Continued)

FOREIGN PATENT DOCUMENTS

DE  40 16 047 A1  11/1991
DE  200 16 386 U1  3/2001

(Continued)

OTHER PUBLICATIONS

German Search Report—Jan. 25, 2010.

(Continued)

*Primary Examiner* — Paul N Dickson
*Assistant Examiner* — Robert A Coker
(74) *Attorney, Agent, or Firm* — Brinks Gilson & Lione (57) ABSTRACT

A steering wheel for a motor vehicle having an airbag module arranged thereon as well as horn contacts arranged on the steering wheel and/or on the airbag module, which can be brought into electric contact with each other in order to activate an acoustic horn signal with the steering wheel installed in a motor vehicle. The horn contacts (13) consist of a conducting sheet (15), which can be mounted by means of an adhesive layer (16) on a substrate formed by the airbag module (10) or the steering wheel.

16 Claims, 6 Drawing Sheets

(56) References Cited

U.S. PATENT DOCUMENTS

| | | | |
|---|---|---|---|
| 6,491,319 B2 * | 12/2002 | Bonn | 280/731 |
| 6,563,069 B2 * | 5/2003 | Simon et al. | 200/512 |
| 6,918,610 B2 * | 7/2005 | Song et al. | 280/728.2 |
| 2002/0041087 A1 * | 4/2002 | Bonn | 280/730.2 |
| 2002/0074780 A1 | 6/2002 | Helmstetter | |
| 2004/0036260 A1 | 2/2004 | Song et al. | |
| 2004/0045797 A1 * | 3/2004 | Bonn et al. | 200/61.54 |

FOREIGN PATENT DOCUMENTS

| | | |
|---|---|---|
| DE | 697 15 859 T2 | 6/2003 |
| WO | WO 2004/039654 A1 | 5/2004 |
| WO | WO 2006/076897 A1 | 7/2006 |
| WO | WO 2007/066513 A1 | 6/2007 |

OTHER PUBLICATIONS

PCT International Search Report—Aug. 27, 2010.

* cited by examiner

STEERING WHEEL WITH HORN CONTACTS ATTACHED BY MEANS OF AN ADHESIVE CONNECTION

CROSS-REFERENCE TO RELATED APPLICATIONS

This application claims priority to German Application No. 10 2009 023 348.2, filed May 29, 2009 and PCT/EP2010/003216, filed May 27, 2010.

FIELD OF THE INVENTION

The invention relates to a steering wheel for a motor vehicle with an airbag module arranged thereon as well as with horn contacts arranged on the steering wheel and/or on the airbag module, which can be brought into electric contact with each other in order to activate an acoustic horn signal when the steering wheel is in an installed condition in a motor vehicle.

BACKGROUND OF THE INVENTION

A steering wheel having the aforementioned generic features is described in WO 2006/076897 A1. The object therein is the integration of horn contacts into a steering wheel, which are brought into electric contact with each other when pressure is exerted on the steering wheel in the direction toward the steering column and thereby activate an acoustic horn signal. If the pressure on the steering wheel is reduced, the horn contacts move out of their contact position into a normal position, in which there is no electric contact between the horn contacts. The horn contacts can be mounted therein respectively on the steering wheel and/or on the airbag module. In the known steering wheel, the horn contacts are configured as strip-shaped contact plates. Screws with corresponding nuts, for example, are provided as attachment means for the metal strips; ultrasonic welded domes are proposed as an alternative. Form-fitting connections in the shape of projections that can be inserted into corresponding openings are additionally provided.

The known steering wheel of the above type has the disadvantage that the configuration of the horn contacts from sheet metal and their attachment on the steering wheel and/or on the airbag module is laborious. The punching of the strip-shaped horn contacts and the required cleaning of the punched edges represent a laborious sheet metal processing step. In another approach, the mounting of screw connections or also the ultrasonic welding in the assembly of the airbag module on the steering wheel are furthermore difficult to carry out and require corresponding processing and assembly steps.

It is an object of the invention to configure a steering wheel such a way that the integration of horn contacts in the design of the steering wheel and/or the airbag module is possible in a simple way.

SUMMARY OF THE INVENTION

The object of the invention, including advantageous embodiments and further developments of the invention, is attained in the manner disclosed in the patent claims attached to this description.

The basic idea of the invention provides that the horn contacts consist of a conducting sheet that can be mounted by means of an adhesive layer on a substrate formed by the airbag module or the steering wheel. The invention has the advantage that the punching or cutting out of the horn contacts from a very thin conductive sheet does not require further processing steps, since no sharp punching edges are produced with these sheets. The thickness of a conductive film is thus within the order of magnitude of between 0.03 and 0.04 mm in comparison to the metal strips known from the prior art, typically which have a thickness of at least 0.5 mm. The gluing of such sheets on the substrate formed by the steering wheel and/or by the airbag module by means of an adhesive layer furthermore does not require any special attachment means or special processing steps, because the horn contacts can be glued in one single process step. The thickness of the adhesive layer amounts therein again to preferably approximately 0.03 mm.

According to a first exemplary embodiment of the invention, the adhesive layer is mounted on the conductive sheet in such a way that the sheet can be mounted in a self-adhesive way on the substrate. This has the advantage that the horn contacts are only placed on the substrate after a protective film, which is generally provided, is removed, and are to be pressed against the substrate in order to complete the attachment.

Insofar as the horn contacts must be electrically isolated from each other, and with respect to an electrically conducting substrate in specific application cases, for example, with a metallic module housing, a simple isolation can be realized in an electrically conducting substrate according to one exemplary embodiment by producing the adhesive layer from an electrically isolating (insulating) adhesive. In an alternative embodiment, the conducting sheet can be glued to an electrically isolating sheet and the electrically isolating sheet can be glued, in turn, to the substrate, in order to configure an electric isolation against the electrically conducting substrate.

According to an exemplary embodiment, the horn contacts are produced by cutting out a defined geometric shape from the sheet, which is available as a flat textile structure, in order to produce the horn contacts; the horn contacts are configured in particular as strip-shaped material webs on the basis of the prior art.

According to an exemplary embodiment of the invention, the material webs can be connected to the substrate by means of punch-through contact rivets, wherein such contact rivets can advantageously configure at the same time a contact point with the counter contact, so that a defined punctiform contact connection is possible for the horn contacts to be brought in contact.

Insofar as it is necessary, depending on the design requirements, to provide separate connection possibilities for current supply or for the connection of further electric functional parts during the configuration of the horn contacts, the material webs are to be provided with attachment pieces molded as one single part for the connection of electric functional parts according to one exemplary embodiment of the invention. The pertinent attachment pieces can be inserted herein into a connector housing, which is connected to the substrate, or the attachment pieces can be configured as grounding webs and are therefore to be integrated into the substrate. The connector housing is configured therein as one piece with the housing of the airbag module or as a separate part connected to the housing. The attachment pieces can furthermore be installed as horn contacts for the connection of several material webs, so that also more complex networks of horn contacts can be created, depending on the size of the airbag module or steering wheel.

In order to produce connecting points for at least two horn contacts within the scope of an extended horn network, at least two material webs, which are placed one over the other in an area, can be mutually connected by means of an electrically conducting adhesive and are contacted in this way.

BRIEF DESCRIPTION OF THE DRAWINGS

Exemplary embodiments of the invention are represented in the drawings and will be described in the following. In the drawings.

DETAILED DESCRIPTION OF THE INVENTION

Figure 1:
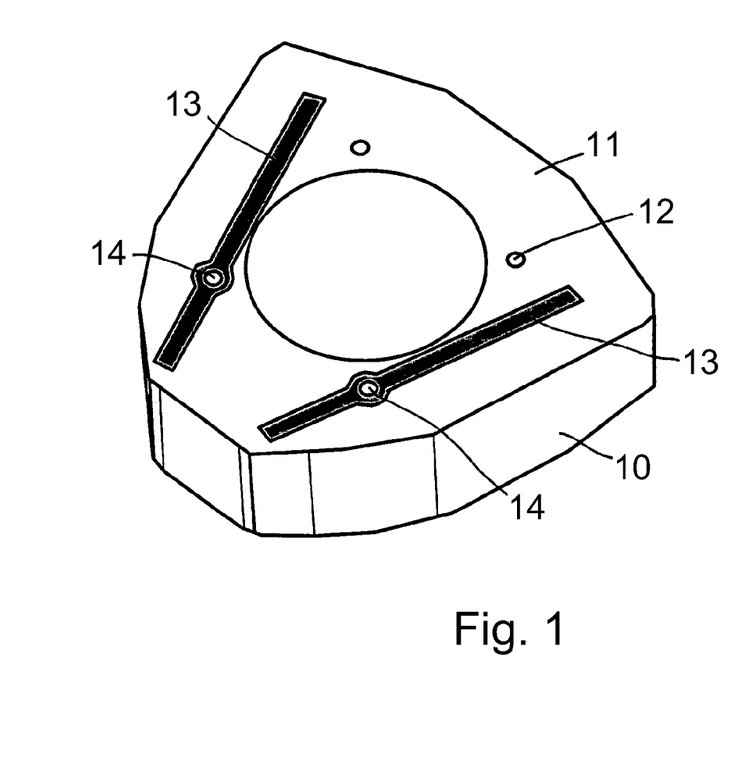
FIG. 1 shows a perspective view of an airbag module having horn contacts arranged on its surface.
Figure 2:
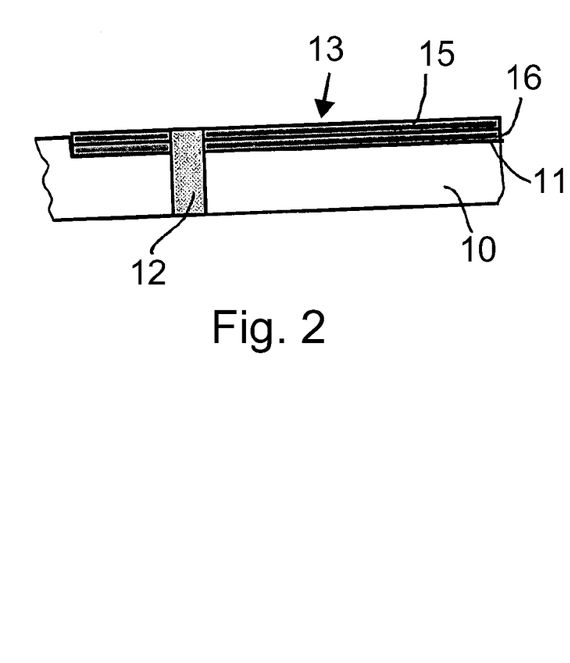
FIG. 2 shows a schematized lateral view of the object of FIG. 1, of which only some sections are depicted.

As can be seen from FIGS. 1 and 2, 10 horn contacts 13 in the form of two separately arranged strip-shaped material webs made from a conductive sheet 15 are mounted on the substrate 11 of a housing of an airbag module 10. Insofar as through holes 12 for accommodating stud bolts for the attachment of the gas generator on the airbag module are provided in the airbag module 10, the strip-shaped horn contacts 13 cover two through holes 12 for the stud bolts, which are not shown, so that through holes 14 for inserting the stud bolts for attachment of the gas generator are likewise configured in the horn contacts 13 in the represented exemplary embodiment.

As can be seen in FIG. 2, the conducting sheet 15 that configures a horn contact is glued by means of an adhesive layer 16 on the surface of the airbag module 10. In the case in which an electric isolation is desired between the horn contact 13 and the airbag module 10, the adhesive layer 16 can be made from an electrically isolating (insulating) adhesive.

Figure 3:
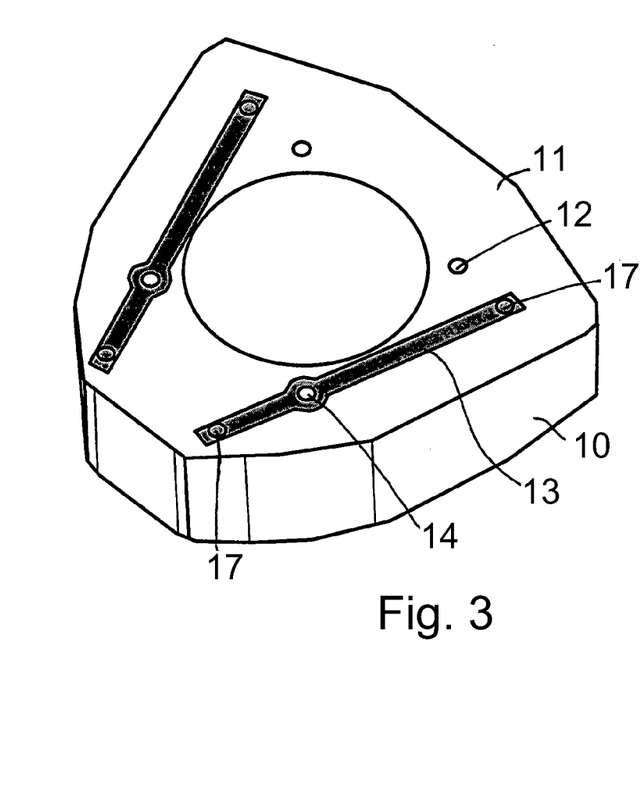
FIG. 3 shows the object of FIG. 1 with additionally arranged contact rivets.
Figure 4:
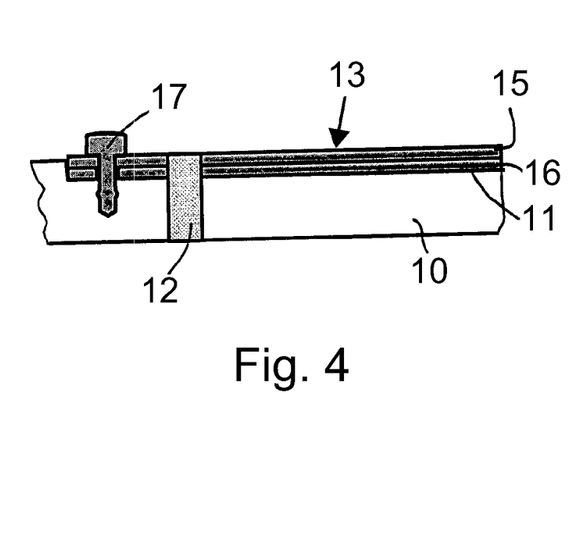
FIG. 4 shows the object of FIG. 3 in a view corresponding to FIG. 2.

The exemplary embodiment shown in FIGS. 3 and 4 differs from the previously described exemplary embodiment in that a contact rivet 17, which punches through the material webs, is arranged at the respective ends of the strip-shaped horn contacts 13, and ensures on the one hand an additional attachment of the strip-shaped horn contacts 13 on the airbag module 10, but on the other hand also configures a contact point with an allocated counter contact, which is not shown.

Figure 5:
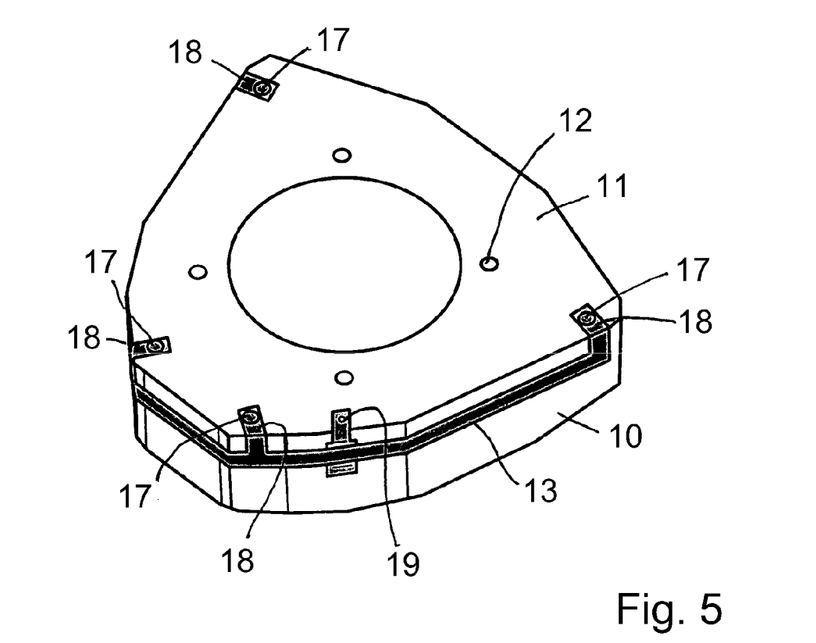
FIG. 5 shows an airbag module having horn contacts arranged over its external periphery in a depiction according to FIG. 1.
Figure 6:
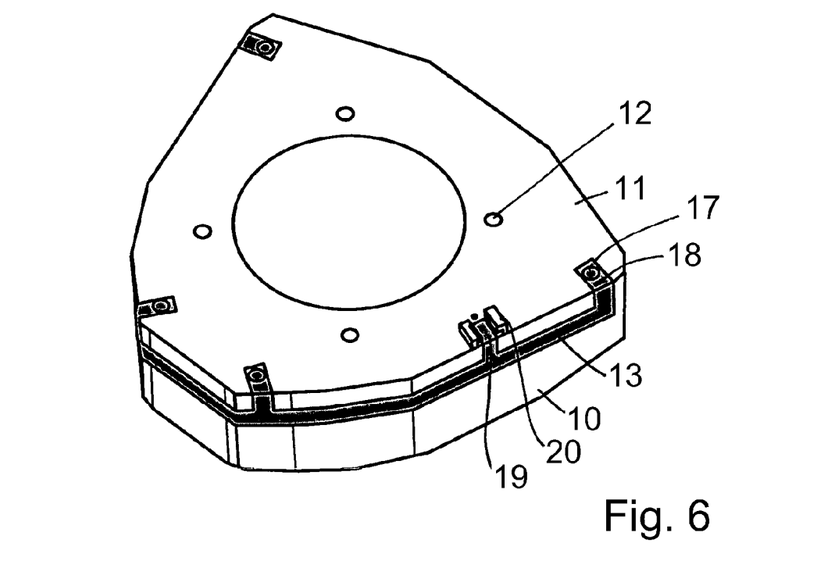
FIG. 6 shows another embodiment of the object of FIG. 5.

According to the exemplary embodiment shown in FIG. 5, a strip-shaped horn contact 13 can also be arranged over the periphery of the airbag module 10, wherein the strip-shaped horn contacts 13 have extensions 18 arranged at intervals with respect to each other, which are folded over at the substrate 11 of the airbag module 10. Into these extensions 18 can then be introduced optional contact rivets 17, as is shown in the exemplary embodiment according to FIG. 5, which ensure contact between the externally running strip-shaped horn contacts 13 and an associated counter contact on the substrate 11. An attachment piece 19, to which further electric functional parts can be connected, can be configured at the same time on the strip-shaped horn contact 13. As can be seen with reference to this in FIG. 6, this attachment piece 19 can be guided, for example, into a connector housing 20 located on the substrate 11 of the airbag module 10, so that a connection possibility is provided via a connector, which is not shown in detail, and which is to be inserted into the connector housing 20 in order to feed or tap electronic signals into or from the horn contacts 13.

Figure 7:
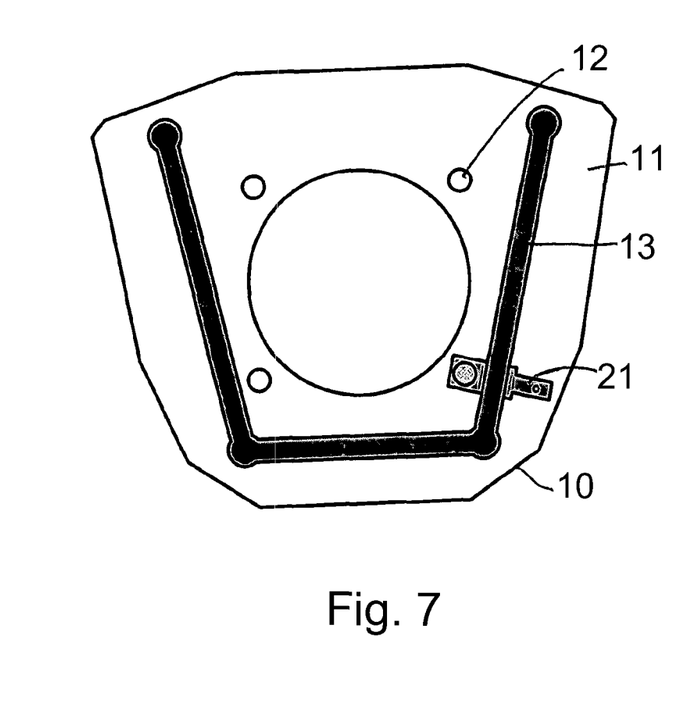
FIG. 7 shows another exemplary embodiment of the airbag module according to FIG. 1.
Figure 8:
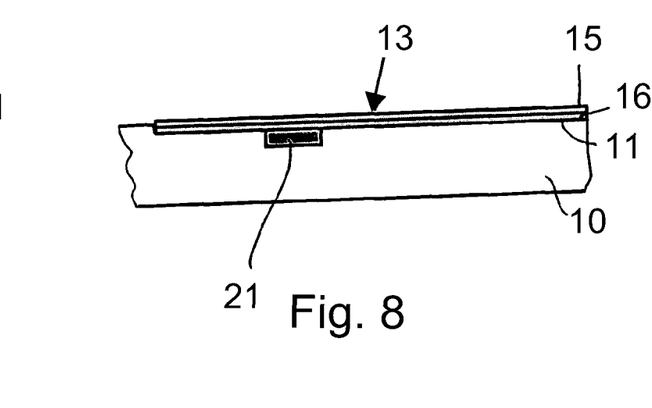
FIG. 8 shows a schematized lateral view of the airbag module according to FIG. 7 in a representation corresponding to FIG. 2, of which only some sections are depicted.
Figure 9:
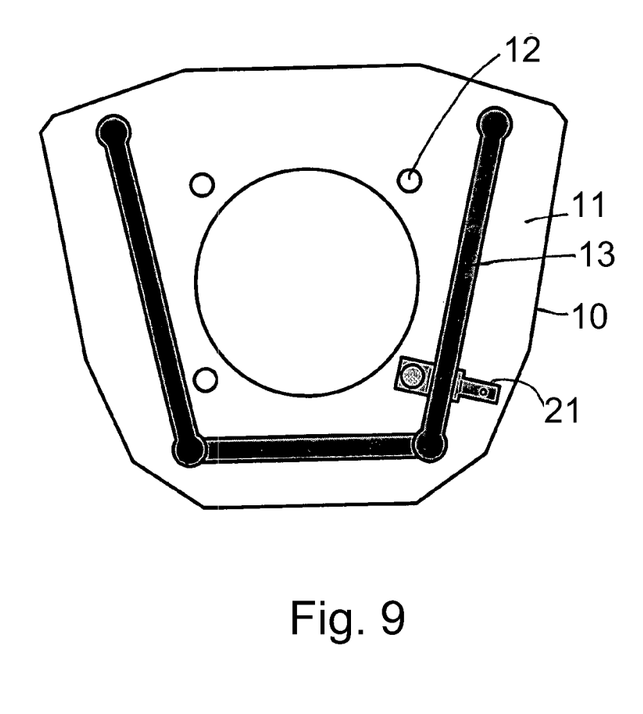
FIG. 9 shows another exemplary embodiment of the airbag module according to FIG. 1.
Figure 10:
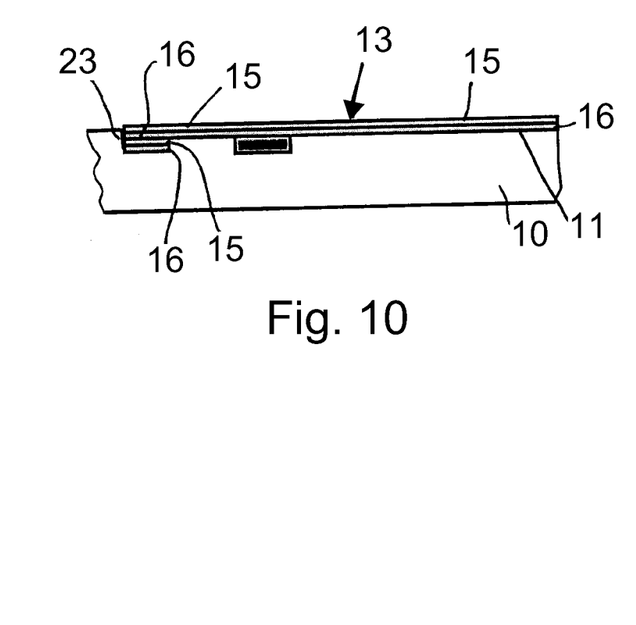
FIG. 10 shows a schematized lateral view of the airbag module according to FIG. 9, of which only some sections are depicted.

As it follows in addition thereto from FIGS. 7 and 8, the attachment pieces can also be configured as grounding webs 21, which are incorporated into the substrate 11 in order to produce the grounding contact. Insofar as separate horn contacts 13 are conductively connected to each other at transition points 23, the corresponding ends of the horn contacts 13 can be placed one over the other and can be respectively connected to each other with an adhesive layer 16, wherein the adhesive is in this case a conducting adhesive.

Figure 11:
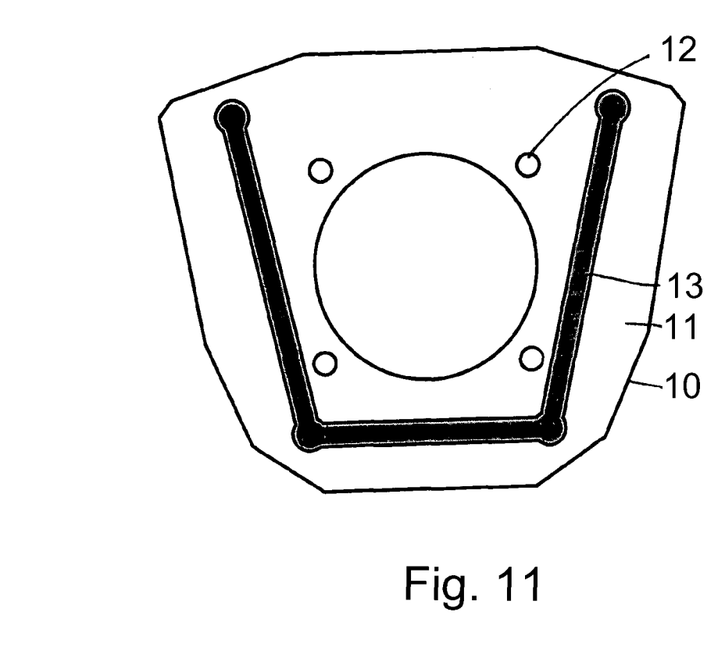
FIG. 11 shows an airbag module having horn contacts arranged on its surface, which are isolated from the airbag module.
Figure 12:
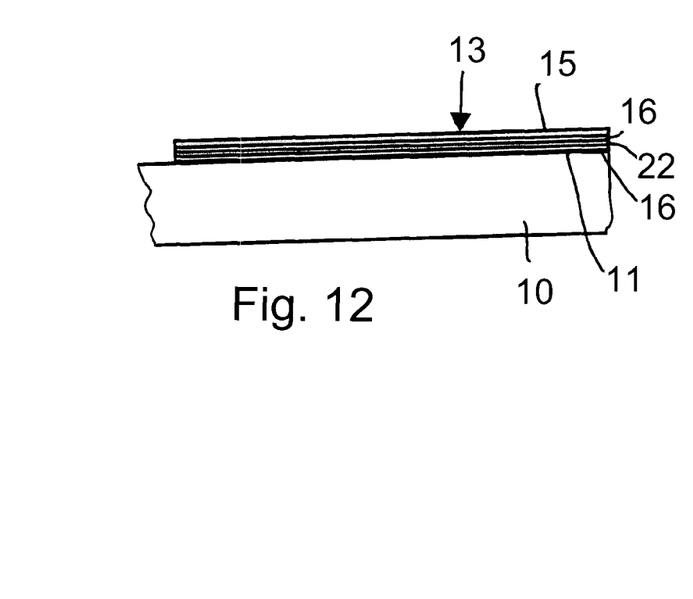
FIG. 12 shows a schematized lateral view of the object of FIG. 11, of which only some sections are depicted.

Finally, FIGS. 11 and 12 show another exemplary embodiment of the invention, in which an electrically isolating (insulating) sheet 22 is glued by means of an adhesive layer 16 on the lower side of the electrically conducting sheet 15 that faces the substrate 11 in order to electrically isolate an electrically conducting sheet 15, which forms a horn contact 13, against the substrate 11, while the isolating sheet 22 is glued, in turn, by means of a corresponding adhesive layer 16 to the allocated substrate in the form of the surface 11 of the airbag module 10.

The features of the object of these documents, which are disclosed in the previous description, the patent claims, the abstract, and the drawings, can be essential, either separately or also in any desired combination with each other, for the realization of the invention in its different embodiments.

While the above description constitutes the preferred embodiment of the present invention, it will be appreciated that the invention is susceptible to modification, variation and change without departing from the proper scope and fair meaning of the accompanying claims.

The invention claimed is:

1. A steering wheel for a motor vehicle comprising:
an airbag module arranged thereon; and
horn contacts arranged on the steering wheel or on the airbag module or both, which can be brought into electric contact with each other in order to activate an acoustic horn signal when the steering wheel is in an installed condition in the motor vehicle, wherein the horn contacts (13) consist of a conducting sheet (15) mounted by means of an adhesive layer (16) on a substrate formed by the airbag module (10) or the steering wheel and wherein the conducting sheet (15) is connected to the substrate via contact rivets (17) that punch through the conducting sheet (15) and form a contact point with a counter contact.

2. The steering wheel of claim 1, further comprising that the adhesive layer (16) is first mounted on the conducting sheet (15) with the sheet (15) thereafter is mounted in a self-adhesive manner on the substrate.

3. The steering wheel of claim 1 further comprising that the adhesive layer (16) is formed of an electrically isolating adhesive.

4. The steering wheel of claim 1 further comprising that the conducting sheet (15) with the adhesive layer (16) is glued to an electrically isolating sheet (22) in order to provide electrical insulation from the electrically conducting substrate, and the electrically isolating sheet (22), is glued on the substrate.

5. The steering wheel of claim 1 further comprising that the horn contacts (13) are produced by cutting out a defined geometrical shape from the sheet in the form of a flat textile structure.

6. The steering wheel of claim 1 further comprising that the horn contacts (13) are configured as at least one strip-shaped material web.

7. The steering wheel of claim 1 further comprising that the conducting sheet (15) includes two material webs placed one over the other and mutually connected by means of an electrically conducting adhesive.

8. A steering wheel for a motor vehicle comprising:
an airbag module arranged thereon; and
horn contacts arranged on the steering wheel or on the airbag module or both, which can be brought into electric contact with each other in order to activate an acoustic horn signal when the steering wheel is in an installed condition in the motor vehicle, wherein the horn contacts (13) consist of a conducting sheet (15) mounted by means of an adhesive layer (16) on a substrate formed by the airbag module (10) or the steering wheel, and
wherein the conducting sheet (15) has one or more tongue-shaped attachment pieces (19) integrated therewith for connection to electric functional parts.

9. The steering wheel of claim 8, further comprising that the attachment pieces (19) are guided into a connector housing (20), which is connected to the substrate.

10. The steering wheel of claim 8, further comprising that the one or more attachment pieces are configured as grounding webs (21).

11. The steering wheel of claim 8, further comprising that the one or more attachment pieces (19) are arranged for the connection of material webs.

12. A steering wheel for a motor vehicle comprising:
an airbag module arranged thereon; and
horn contacts arranged on the steering wheel or on the airbag module or both, which can be brought into electric contact with each other in order to activate an acoustic horn signal when the steering wheel is in an installed condition in the motor vehicle, wherein the horn contacts (13) consist of a conducting sheet (15) mounted by means of an adhesive layer (16) on a substrate formed by the airbag module (10) or the steering wheel and wherein the conducting sheet (15) includes electrically conductive contact rivets,
wherein the conducting sheet (15) includes two material webs placed one over the other and mutually connected by means of an electrically conducting adhesive.

13. The steering wheel of claim 12, further comprising that the adhesive layer (16) is first mounted on the conducting sheet (15) with the sheet (15) thereafter is mounted in a self-adhesive manner on the substrate.

14. The steering wheel of claim 12, further comprising that the adhesive layer (16) is formed of an electrically isolating adhesive.

15. The steering wheel of claim 12, further comprising that the conducting sheet (15) with the adhesive layer (16) is glued to an electrically isolating sheet (22) in order to provide electrical insulation from the electrically conducting substrate, and the electrically isolating sheet (22), is glued on the substrate.

16. The steering wheel of claim 12, further comprising that the conducting sheet (15) has one or more attachment pieces (19) integrated therewith for connection to electric functional parts.

* * * * *